United States Patent [19]

Jimenez

[11] Patent Number: 4,512,143
[45] Date of Patent: Apr. 23, 1985

[54] CARRIAGE FOR A TRIMMING DEVICE

[76] Inventor: Raul Jimenez, 5308 Jerri La., Fort Worth, Tex. 76117

[21] Appl. No.: 551,126

[22] Filed: Nov. 14, 1983

[51] Int. Cl.³ .................. A01G 3/06; A01D 53/00
[52] U.S. Cl. ............................ 56/16.7; 56/17.5; 56/DIG. 18
[58] Field of Search ............ 56/16.7, 16.9, 256, 56/122, DIG. 18, 17.5

[56] References Cited

U.S. PATENT DOCUMENTS

| | | | |
|---|---|---|---|
| 1,257,455 | 2/1918 | Braun | 56/DIG. 18 |
| 1,263,249 | 4/1918 | Hoppes | 56/DIG. 18 |
| 2,319,038 | 5/1943 | Clemson | 56/DIG. 18 |
| 2,796,715 | 6/1957 | Meltzer | 56/17.2 |
| 3,601,958 | 8/1971 | Roof | 56/6 |
| 4,033,098 | 7/1977 | Green | 56/DIG. 18 |
| 4,156,967 | 6/1979 | Ballas, Sr. | 56/DIG. 18 |
| 4,364,435 | 12/1982 | Tuggle et al. | 56/DIG. 18 |
| 4,389,836 | 6/1983 | Lowry et al. | 56/12.7 |
| 4,411,126 | 10/1983 | Lowry et al. | 56/17.5 |

FOREIGN PATENT DOCUMENTS 253199 2/1948 Switzerland .................. 56/17.5

Primary Examiner—Paul J. Hirsch
Attorney, Agent, or Firm—Kanz, Scherback & Timmons

[57] ABSTRACT

A carriage for a trimming device for grass, weeds and the like having at least two runners (20 and 22), a grip (24) for gripping a handle pole (26) of the trimming device and holders (28 and 30) affixed to the grip for holding the runners in a spaced apart relationship for supporting the device is disclosed. Opposing grip members (33 and 35) form a channel (42) for receiving the handle pole and two cross channels (34 and 36) for holding the runner holders. One arrangement for use with a trimmer having a skirt includes a substantially horizontal front skirt support connecting the runners together near the fronts of the runners and a substantially horizontal back skirt support connecting the runners near the backs of the runners along with a front clamp and a back clamp for clamping the skirts to the supports.

3 Claims, 3 Drawing Figures

CARRIAGE FOR A TRIMMING DEVICE

DESCRIPTION

1. Technical Field

The present invention relates generally to devices for trimming grass, weeds and the like and, in one of its aspects, for a carriage for such trimming devices.

Devices for trimming grass, weeds and the like with a rapidly rotating cable of nylon or similar material have been used for some years now. Such devices are used for trimming in places that cannot be usually reached with a lawn mower and in many situations replace hand clippers.

2. Background Art

In a number of circumstances, the weight of rotary trimming devices has limited their use and in many other situations have caused discomfort for users. As a result, numerous carriages have been developed for such trimming devices. The carriage shown in U.S. Pat. No. 4,287,709 and U.S. Pat. No. 4,343,139 of Lowry et al are fairly representative of such carriages which are patterned after conventional lawn mowers with a wheeled platform and separate telescopying handle rod. These carriages also show the use of a fifth wheel for tipping the carriage and the attached trimming device to aid in certain edging type opeations.

Another wheeled carriage for trimming devices with a separate handle is also shown in U.S. Pat. No. 4,389,836 also of Lowry et al.

A different approach to such carriages is shown in U.S. Pat. No. 4,182,100 of Letter. Letter shows the use of a wheeled tricycle type frame made up of tubing rather than a platform. The Letter patent also shows a more flexible way of guiding the trimmer with the use of support springs along with handlebars to hold the timming cable out from the carriage.

DISCLOSURE OF INVENTION

In accordance with the present invention, a carriage for a trimming device includes at least two runners and means for attaching the at least two runners to the trimming device. The runners and the means for attaching the runners support the trimming device. One preferred form of the attaching means includes means for gripping the handle pole of the trimming device and means for holding two runners in a spaced apart relationship below and on opposite sides of the trimming device for giving balanced support. One form of the means for gripping the handle pole includes opposing grip members forming a channel for receiving the handle pole and in two cross channels transverse to and on opposite side of the channel for receiving the means for holding two runners. The means for holding two runners includes two tubes, one tube received by each of the cross channels, means for securing the tubes in the cross channels, and means for securing the ends of the tubes which are opposite the gripping means to the runners.

A preferred form of the present invention for use with a trimming device of the type having a skirt extending generally transverse to the axis of rotation of the motor includes means for attaching the at least two runners comprising a substantially horizontal front skirt support connecting the runners near the fronts of the runners and supporting the skirt near the front of the trimming device, and a substantially horizontal back skirt support connecting the runners near the backs of the runners and supporting the skirt near the back of the trimming device. Such a carriage, in a preferred form, also includes a front clamp for clamping the skirt to the front skirt support, and a back clamp for clamping the skirt to the back skirt support.

Thus, a trimming device according to the present invention would include a motor, a housing for the motor, a cutting element connected to the motor so as to be rotatable in a plane substantially parallel to a surface upon which the trimming device is resting, and at least two runners for supporting the trimming device upon the surface.

The runners are typically lightweight tubing as is the means for attaching the runners to the trimming device. In one arrangement, the portion of the runners which would be in contact with a supporting surface are coated with nylon or similar material.

The improved carriage of this invention possesses the advantages of being lighter and more maneuverable than the wheeled platform carriages while being smaller and of simpler construction than a tricycle type frame with spring supports for the trimming device. Since the carriage of the present invention is made mostly of lightweight tubing, is fairly small and does not have wheels, it is very light in comparison to prior carriages.

These and other objects, advantages and features of this invention will be apparent from the following description taken with reference to the accompanying drawing, wherein is shown the preferred embodiments of the invention.

BEST MODE FOR CARRYING OUT THE INVENTION

Figure 1:
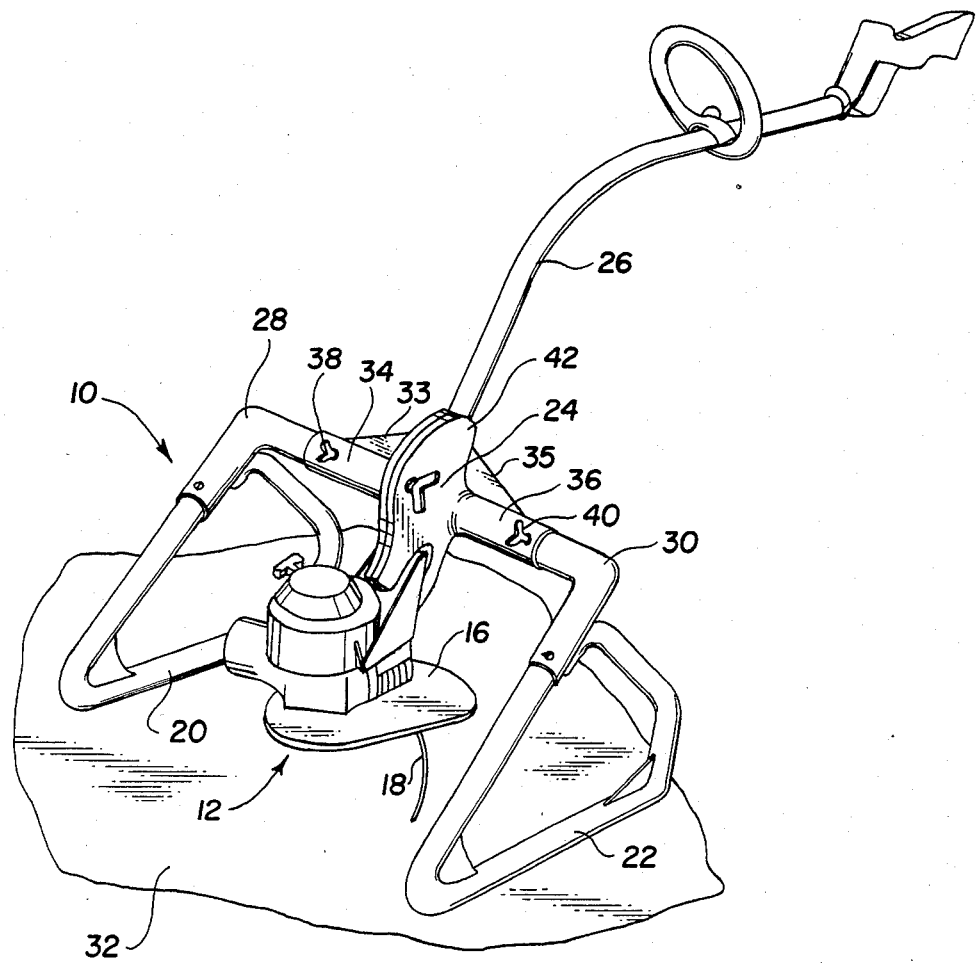
FIG. 1 is a perspective view of a preferred form of a trimming device according to the present invention.
Figure 2:
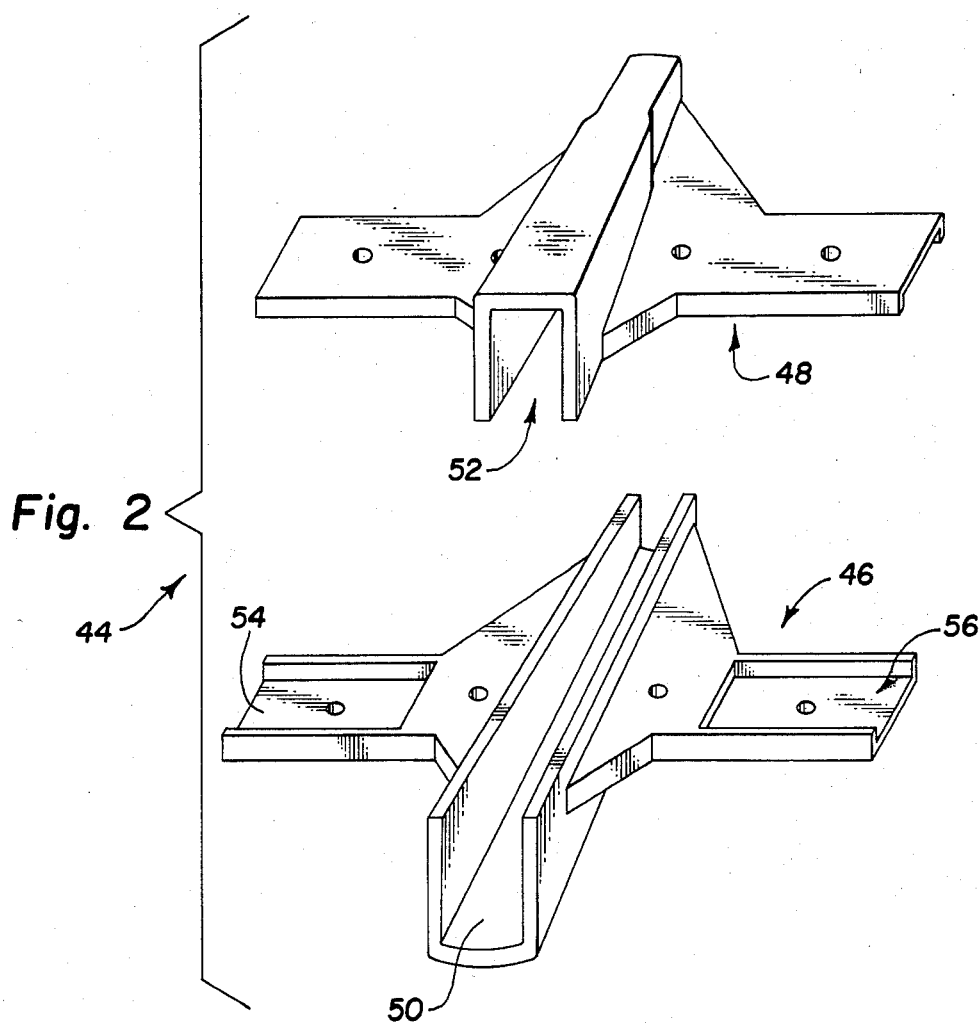
FIG. 2 is an alternative embodiment of a means for gripping a handle pole of a trimming device.

Referring now to the drawing, and in particular to FIG. 1, a carriage according to the present invention is referred to generally by reference numeral 10. Carriage 10 supports a trimming device 12 having a motor housing 16 enclosing a motor (not shown), and a cutting element in the form of a length of cable 18 connected to the motor so as to be rotatable about an axis at high speed for cutting grass, weeds and the like. Carriage 10 includes at least two runners 20 and 22 and means for attaching the at least two runners to trimming device 12, such means including means 24 for gripping handle pole 26 and means such as tubes 28 and 30 for holding runners 20 and 22 in a spaced apart relationship below and on opposite sides of the trimming device so that the runners support the trimming device above a support surface 32 for the runners. Means for holding the runners includes two tubes 28 and 30, one tube received by each of two cross channels 34 and 36 of means 24. Tubes 28 and 30 are secured in cross channels 34 and 36 by means such as wing nuts 38 and 40. Means 24 for gripping handle pole 26 also forms a channel 42 for receiving the handle pole. This is shown more clearly in FIG. 2 which also shows an alternative embodiment 44 of means for gripping the handle pole. Means 44 for gripping a handle pole includes opposing grip members 46 and 48 which form a channels 50 and 52 which is a single channel when opposing grip members 46 and 48 are mated. Two cross channels 54 and 56 are for receiving the means for holding two runners.

It can now be seen that a trimming device according to the present invention for resting on a surface 32 during normal use includes he combination of a motor 14, a housing 16 for the motor, a cutting element such as cord 18 connected to the motor so as to be rotatable in a plane sustantially parallel to surface 32, and at least two runners 20 and 22 for supporting the trimming device upon the surface. The runners, means for gripping the handle pole and means for holding the runners in a spaced apart relationship have been described as separate elements connected together, but they could also form elements of a unitary whole without departing from the scope of the invention.

Figure 3:
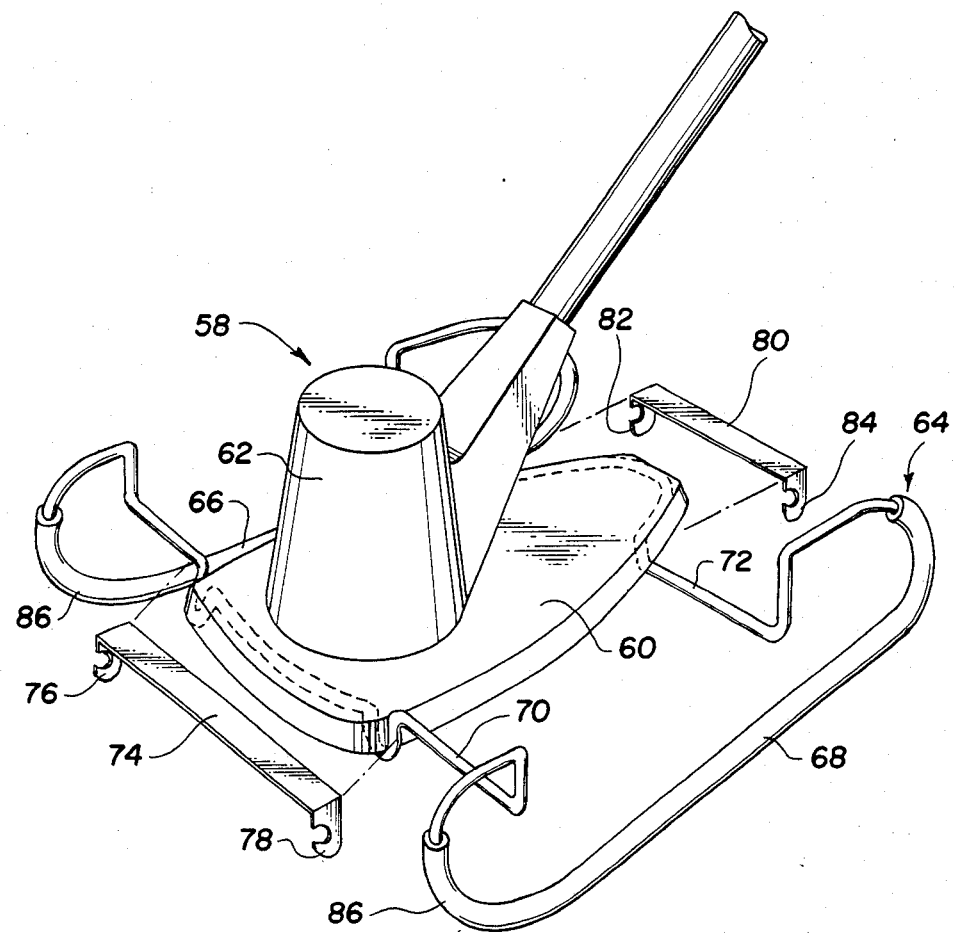
FIG. 3 is an alternative embodiment of a carriage and trimming device according to the present invention.

Referring now to FIG. 3, a carriage according to the present invention for use with a trimming device 58 of the type also having a skirt 60 extending generally transverse to the axis of rotation of the motor 62 is referred to generally by reference numeral 64. Carriage 64 includes runners 66 and 68 means for attaching the runners to trimming device 58 which includes a substantially horizontal front skirt support 70 connecting runner 66 to runner 68 near the fronts of the runners and supporting skirt 60 near the front of trimming device 58, and substantially horizontal back skirt support 72 connecting runners 66 and 68 near the backs of the runners and supportint skirt 60 near the back of trimming device 58. In the particular embodiment illustrated, front skirt support 70, back shirt support 72 and runners 66 and 68 are all of a unitary construction from a lightweight tube or heavy duty wire. In one form, the means for attaching the at least two runners further includes a front clamp 74 for clamping skirt 60 to front skirt support 70 by hooking over front skirt supprt 70 with hooks 76 and 78 to the sides of the skirt. Similarly, the means attaching the at least two runners include a back clamp 80 for clamping skirt 60 to back skirt support 72 by hooking hooks 82 and 84 over back skirt support 72 to the sides of skirt 60. In one form, runners 66 and 68 are coated with nylon 86 or a similar material to improve the gliding action of the carriage.

From the foregoing it will be seen that this invention is one well adapted to obtain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawing is to be interpreted as illustrative and not in a limiting sense.

I claim:

1. A carriage for a trimming device of the type having a motor, a housing for the motor, a handle pole, and a cutting element in the form of a length of cable connected to the motor so as to be rotatable about an axis at high speed for cutting grass, weeds and the like comprising in combination:

at least two runners;

opposing grip members for gripping the handle pole, forming a channel for receiving the handle pole and two cross channels transverse to and on opposite sides of the channel for receiving the handle pole;

two tubes, one tube received by each of the cross channels;

means for securing the tubes in the cross channels; and means for securing the ends of the tubes opposite the gripping means to the runners wherein the runners support the trimming device.

2. A carriage for a trimming device of the type having a motor, a housing for the motor, a skirt extending generally transverse to the axis of the motor, and a cutting element in the form of a length of cable connected to the motor so as to be rotatable about an axis at high speed for cutting grass, weeds and the like, comprising in combination:

at least two runners;

a substantially horizontal front skirt support connecting the runners near the fronts of the runners and supporting the skirt near the front of the trimming device; and a substantially horizontal back skirt support connecting the runners near the backs of the runners and supporting the skirt near the back of the trimming device wherein the runners support the trimming device.

3. A carriage according to claim 2 wherein the means for attaching the at least two runners further comprises:

a front clamp for clamping the skirt to the front skirt support; and a back clamp for clamping the skirt to the back skirt support.

* * * * *